US012591704B2

(12) United States Patent
Sofer et al.

(10) Patent No.: US 12,591,704 B2
(45) Date of Patent: Mar. 31, 2026

(54) ENTITY-WIDE DATABASE ASSET INDEX GENERATION

(71) Applicant: International Business Machines Corporation, Armonk, NY (US)

(72) Inventors: Oded Sofer, Midreshet Ben Gurion (IL); Aviv Ron, Klachim (IL); Shachaf Katz, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 18/521,346

(22) Filed: Nov. 28, 2023

(65) Prior Publication Data

US 2025/0173455 A1     May 29, 2025

(51) Int. Cl.
*H04L 41/12*          (2022.01)
*G06F 21/62*          (2013.01)
*H04L 41/046*         (2022.01)
*H04L 41/0853*        (2022.01)

(52) U.S. Cl.
CPC ........ *G06F 21/6227* (2013.01); *H04L 41/046* (2013.01); *H04L 41/0853* (2013.01); *H04L 41/12* (2013.01); *G06F 2221/2101* (2013.01)

(58) Field of Classification Search
CPC ........ H04L 41/046; H04L 41/12; H04L 43/12
See application file for complete search history.

(56) References Cited

U.S. PATENT DOCUMENTS 5,925,106 A     7/1999  Nielsen
9,584,367 B2 *  2/2017  Zizlavsky  ........... H04L 41/0873

9,733,811 B2     8/2017  Rad et al.
10,986,135 B2 *  4/2021  Molloy  .................. H04L 63/20
(Continued)

FOREIGN PATENT DOCUMENTS

EP          0800143 A2    12/2004

OTHER PUBLICATIONS

"Assets Management", Dec. 2022, obtained online from <https://web.archive.org/web/20221205120318/https://documentation.solarwinds.com/en/success_center/swsd/content/completeguidetoswsd/discovery-assets-management.htm>, retrieved on Oct. 15, 2025 (Year: 2022).*

(Continued)

*Primary Examiner* — Zhimei Zhu
(74) *Attorney, Agent, or Firm* — Yee & Associates, P.C.

(57)          ABSTRACT

Entity-wide database asset index generation is provided. An entity-wide database asset index corresponding to an entity is generated identifying all observed database instances across a plurality of database servers by each respective security monitoring system of a plurality of different security monitoring systems corresponding to the entity and one or more linked sets of same database instances observed by more than one security monitoring system of the plurality of different security monitoring systems. Security analytics are performed on the entity-wide database asset index that identifies all of the observed database instances across the plurality of database servers by each respective security monitoring system of the plurality of different security monitoring systems corresponding to the entity and the one or more linked sets of same database instances observed by more than one security monitoring system of the plurality of different security monitoring systems to detect any database security threats.

20 Claims, 5 Drawing Sheets

(56) References Cited

U.S. PATENT DOCUMENTS

| | | | | |
|---|---|---|---|---|
| 11,223,529 B1* | 1/2022 | Newman | | H04L 49/354 |
| 11,922,204 B1* | 3/2024 | Balles | | G06F 9/45558 |
| 2003/0014518 A1* | 1/2003 | Richard | | H04L 41/00 |
| | | | | 709/224 |
| 2004/0151128 A1* | 8/2004 | Wechter | | H04L 45/02 |
| | | | | 370/254 |
| 2012/0275311 A1* | 11/2012 | Ivershen | | H04L 41/12 |
| | | | | 370/241 |
| 2015/0127806 A1* | 5/2015 | Zizlavsky | | H04L 41/0873 |
| | | | | 709/224 |
| 2019/0361851 A1* | 11/2019 | Rogynskyy | | H04L 43/065 |
| 2020/0351298 A1 | 11/2020 | Paturi et al. | | |
| 2021/0336992 A1 | 10/2021 | Shivanna et al. | | |
| 2022/0210168 A1 | 6/2022 | Yavo et al. | | |
| 2023/0110265 A1 | 4/2023 | Fainberg | | |
| 2023/0177172 A1* | 6/2023 | Seth | | H04L 9/008 |
| | | | | 713/189 |
| 2024/0202007 A1* | 6/2024 | Chan | | G06F 9/4416 |

OTHER PUBLICATIONS

Mallede, et al., "Algorithms for Mapping RDB Schema to RDF for Facilitating Access to Deep Web," Web 2013: The First International Conference on Building and Exploring Web Based Environments, Jan. 2013, 22 pages, ResearchGate, accessed Nov. 7, 2023, https://www.researchgate.net/publication/261176780_Algorithms_for_Mapping_RDB_Schema_to_RDF_for_Facilitating_Access_to_Deep_Web.

Stanescu, et al., "An Algorithm for Mapping the Relational Databases to MongoDB—A Case Study," International Journal of Computer Science and Applications, Jan. 2017, accessed Nov. 7, 2023, https://www.researchgate.net/publication/318599517_An_algorithm_for_mapping_the_relational_databases_to_mongodb_-_a_case_study.

* cited by examiner

COMPUTING ENVIRONMENT
100

FIG. 3A

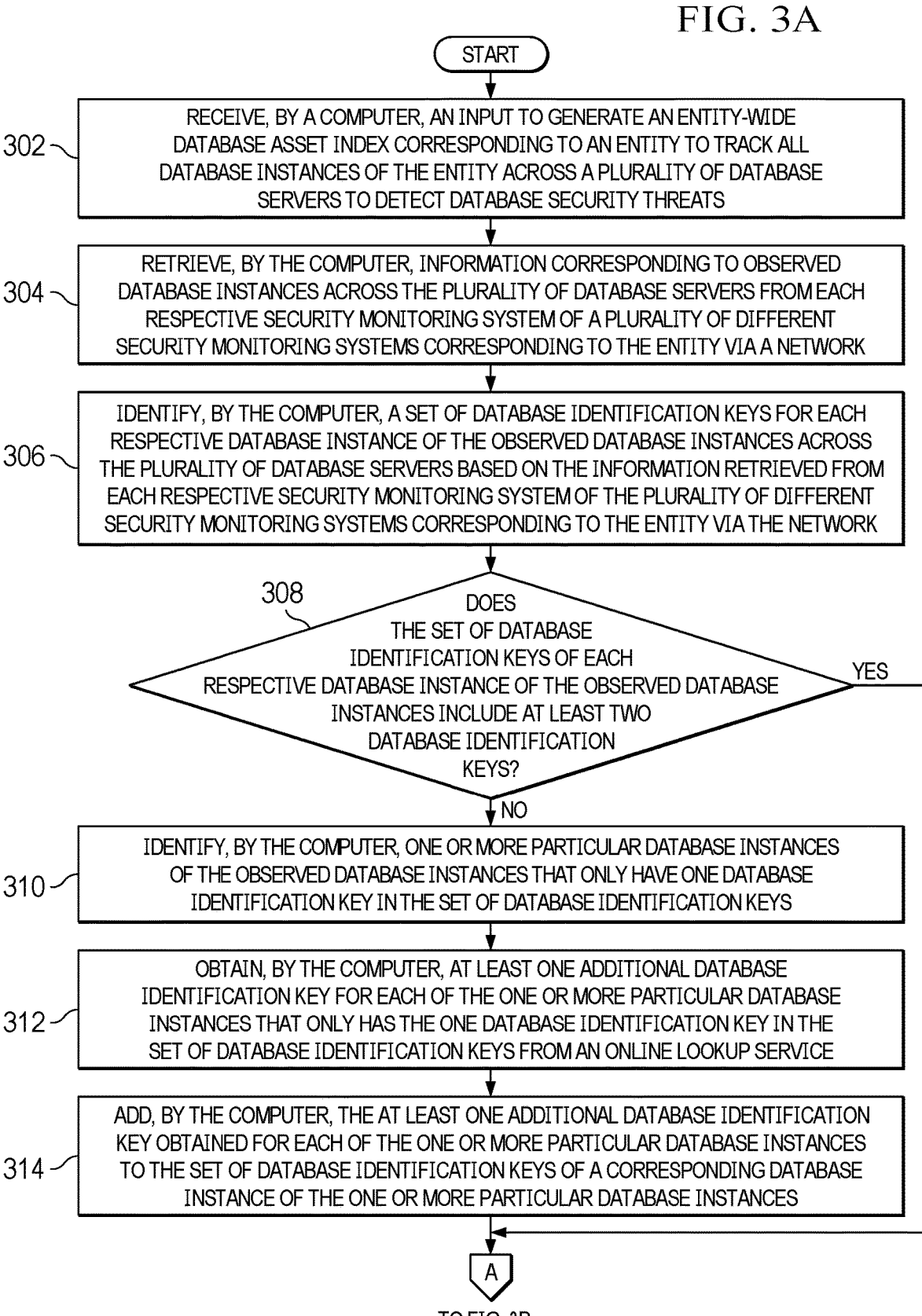

START

302 — RECEIVE, BY A COMPUTER, AN INPUT TO GENERATE AN ENTITY-WIDE DATABASE ASSET INDEX CORRESPONDING TO AN ENTITY TO TRACK ALL DATABASE INSTANCES OF THE ENTITY ACROSS A PLURALITY OF DATABASE SERVERS TO DETECT DATABASE SECURITY THREATS

304 — RETRIEVE, BY THE COMPUTER, INFORMATION CORRESPONDING TO OBSERVED DATABASE INSTANCES ACROSS THE PLURALITY OF DATABASE SERVERS FROM EACH RESPECTIVE SECURITY MONITORING SYSTEM OF A PLURALITY OF DIFFERENT SECURITY MONITORING SYSTEMS CORRESPONDING TO THE ENTITY VIA A NETWORK

306 — IDENTIFY, BY THE COMPUTER, A SET OF DATABASE IDENTIFICATION KEYS FOR EACH RESPECTIVE DATABASE INSTANCE OF THE OBSERVED DATABASE INSTANCES ACROSS THE PLURALITY OF DATABASE SERVERS BASED ON THE INFORMATION RETRIEVED FROM EACH RESPECTIVE SECURITY MONITORING SYSTEM OF THE PLURALITY OF DIFFERENT SECURITY MONITORING SYSTEMS CORRESPONDING TO THE ENTITY VIA THE NETWORK

308 — DOES THE SET OF DATABASE IDENTIFICATION KEYS OF EACH RESPECTIVE DATABASE INSTANCE OF THE OBSERVED DATABASE INSTANCES INCLUDE AT LEAST TWO DATABASE IDENTIFICATION KEYS?

YES

NO

310 — IDENTIFY, BY THE COMPUTER, ONE OR MORE PARTICULAR DATABASE INSTANCES OF THE OBSERVED DATABASE INSTANCES THAT ONLY HAVE ONE DATABASE IDENTIFICATION KEY IN THE SET OF DATABASE IDENTIFICATION KEYS

312 — OBTAIN, BY THE COMPUTER, AT LEAST ONE ADDITIONAL DATABASE IDENTIFICATION KEY FOR EACH OF THE ONE OR MORE PARTICULAR DATABASE INSTANCES THAT ONLY HAS THE ONE DATABASE IDENTIFICATION KEY IN THE SET OF DATABASE IDENTIFICATION KEYS FROM AN ONLINE LOOKUP SERVICE

314 — ADD, BY THE COMPUTER, THE AT LEAST ONE ADDITIONAL DATABASE IDENTIFICATION KEY OBTAINED FOR EACH OF THE ONE OR MORE PARTICULAR DATABASE INSTANCES TO THE SET OF DATABASE IDENTIFICATION KEYS OF A CORRESPONDING DATABASE INSTANCE OF THE ONE OR MORE PARTICULAR DATABASE INSTANCES

FROM FIG. 3A  A

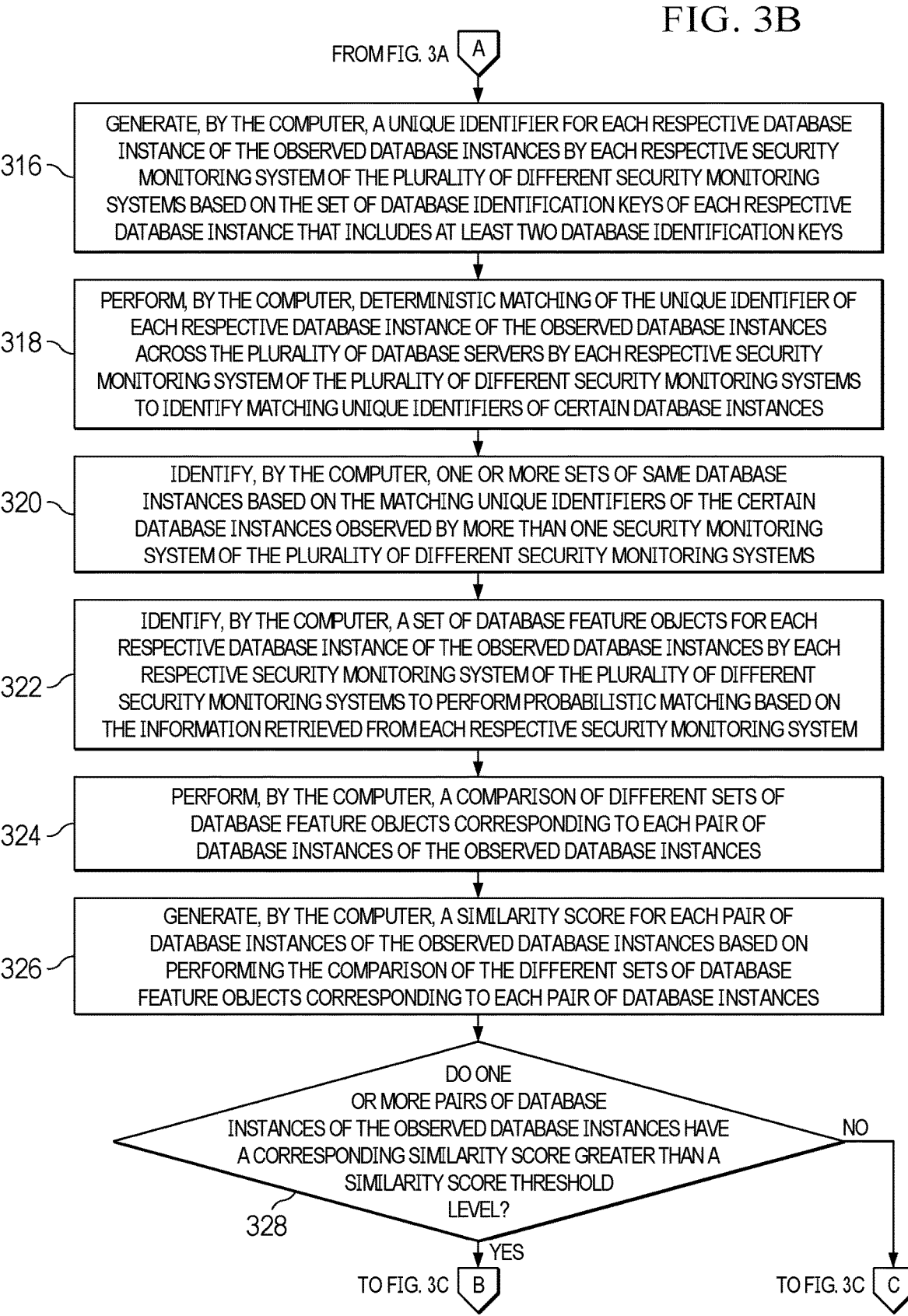

316 — GENERATE, BY THE COMPUTER, A UNIQUE IDENTIFIER FOR EACH RESPECTIVE DATABASE INSTANCE OF THE OBSERVED DATABASE INSTANCES BY EACH RESPECTIVE SECURITY MONITORING SYSTEM OF THE PLURALITY OF DIFFERENT SECURITY MONITORING SYSTEMS BASED ON THE SET OF DATABASE IDENTIFICATION KEYS OF EACH RESPECTIVE DATABASE INSTANCE THAT INCLUDES AT LEAST TWO DATABASE IDENTIFICATION KEYS

318 — PERFORM, BY THE COMPUTER, DETERMINISTIC MATCHING OF THE UNIQUE IDENTIFIER OF EACH RESPECTIVE DATABASE INSTANCE OF THE OBSERVED DATABASE INSTANCES ACROSS THE PLURALITY OF DATABASE SERVERS BY EACH RESPECTIVE SECURITY MONITORING SYSTEM OF THE PLURALITY OF DIFFERENT SECURITY MONITORING SYSTEMS TO IDENTIFY MATCHING UNIQUE IDENTIFIERS OF CERTAIN DATABASE INSTANCES

320 — IDENTIFY, BY THE COMPUTER, ONE OR MORE SETS OF SAME DATABASE INSTANCES BASED ON THE MATCHING UNIQUE IDENTIFIERS OF THE CERTAIN DATABASE INSTANCES OBSERVED BY MORE THAN ONE SECURITY MONITORING SYSTEM OF THE PLURALITY OF DIFFERENT SECURITY MONITORING SYSTEMS

322 — IDENTIFY, BY THE COMPUTER, A SET OF DATABASE FEATURE OBJECTS FOR EACH RESPECTIVE DATABASE INSTANCE OF THE OBSERVED DATABASE INSTANCES BY EACH RESPECTIVE SECURITY MONITORING SYSTEM OF THE PLURALITY OF DIFFERENT SECURITY MONITORING SYSTEMS TO PERFORM PROBABILISTIC MATCHING BASED ON THE INFORMATION RETRIEVED FROM EACH RESPECTIVE SECURITY MONITORING SYSTEM

324 — PERFORM, BY THE COMPUTER, A COMPARISON OF DIFFERENT SETS OF DATABASE FEATURE OBJECTS CORRESPONDING TO EACH PAIR OF DATABASE INSTANCES OF THE OBSERVED DATABASE INSTANCES

326 — GENERATE, BY THE COMPUTER, A SIMILARITY SCORE FOR EACH PAIR OF DATABASE INSTANCES OF THE OBSERVED DATABASE INSTANCES BASED ON PERFORMING THE COMPARISON OF THE DIFFERENT SETS OF DATABASE FEATURE OBJECTS CORRESPONDING TO EACH PAIR OF DATABASE INSTANCES

DO ONE OR MORE PAIRS OF DATABASE INSTANCES OF THE OBSERVED DATABASE INSTANCES HAVE A CORRESPONDING SIMILARITY SCORE GREATER THAN A SIMILARITY SCORE THRESHOLD LEVEL?

328

NO

YES

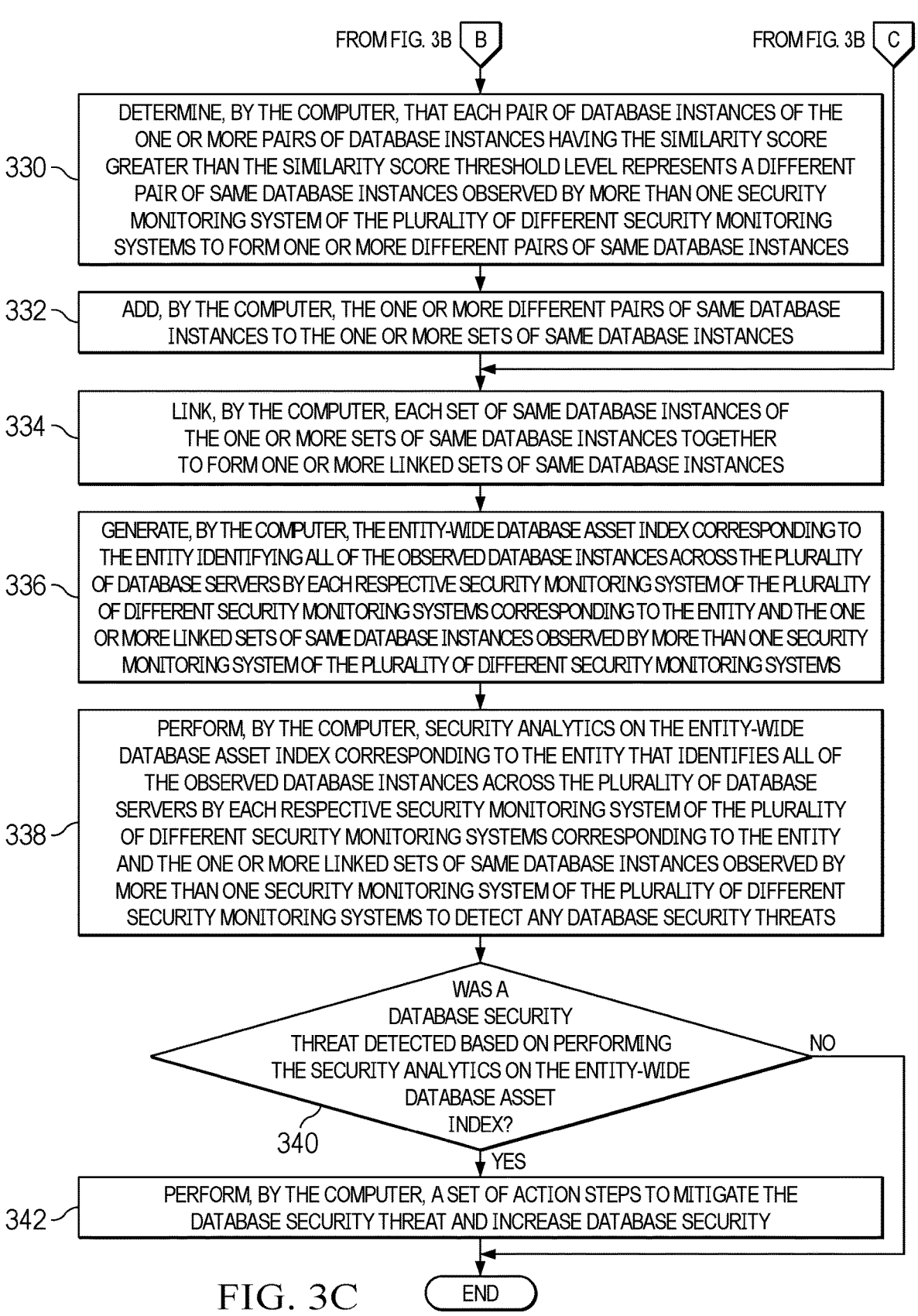

FROM FIG. 3B [B]                                      FROM FIG. 3B [C]

330 — DETERMINE, BY THE COMPUTER, THAT EACH PAIR OF DATABASE INSTANCES OF THE ONE OR MORE PAIRS OF DATABASE INSTANCES HAVING THE SIMILARITY SCORE GREATER THAN THE SIMILARITY SCORE THRESHOLD LEVEL REPRESENTS A DIFFERENT PAIR OF SAME DATABASE INSTANCES OBSERVED BY MORE THAN ONE SECURITY MONITORING SYSTEM OF THE PLURALITY OF DIFFERENT SECURITY MONITORING SYSTEMS TO FORM ONE OR MORE DIFFERENT PAIRS OF SAME DATABASE INSTANCES

332 — ADD, BY THE COMPUTER, THE ONE OR MORE DIFFERENT PAIRS OF SAME DATABASE INSTANCES TO THE ONE OR MORE SETS OF SAME DATABASE INSTANCES

334 — LINK, BY THE COMPUTER, EACH SET OF SAME DATABASE INSTANCES OF THE ONE OR MORE SETS OF SAME DATABASE INSTANCES TOGETHER TO FORM ONE OR MORE LINKED SETS OF SAME DATABASE INSTANCES

336 — GENERATE, BY THE COMPUTER, THE ENTITY-WIDE DATABASE ASSET INDEX CORRESPONDING TO THE ENTITY IDENTIFYING ALL OF THE OBSERVED DATABASE INSTANCES ACROSS THE PLURALITY OF DATABASE SERVERS BY EACH RESPECTIVE SECURITY MONITORING SYSTEM OF THE PLURALITY OF DIFFERENT SECURITY MONITORING SYSTEMS CORRESPONDING TO THE ENTITY AND THE ONE OR MORE LINKED SETS OF SAME DATABASE INSTANCES OBSERVED BY MORE THAN ONE SECURITY MONITORING SYSTEM OF THE PLURALITY OF DIFFERENT SECURITY MONITORING SYSTEMS

338 — PERFORM, BY THE COMPUTER, SECURITY ANALYTICS ON THE ENTITY-WIDE DATABASE ASSET INDEX CORRESPONDING TO THE ENTITY THAT IDENTIFIES ALL OF THE OBSERVED DATABASE INSTANCES ACROSS THE PLURALITY OF DATABASE SERVERS BY EACH RESPECTIVE SECURITY MONITORING SYSTEM OF THE PLURALITY OF DIFFERENT SECURITY MONITORING SYSTEMS CORRESPONDING TO THE ENTITY AND THE ONE OR MORE LINKED SETS OF SAME DATABASE INSTANCES OBSERVED BY MORE THAN ONE SECURITY MONITORING SYSTEM OF THE PLURALITY OF DIFFERENT SECURITY MONITORING SYSTEMS TO DETECT ANY DATABASE SECURITY THREATS

340 — WAS A DATABASE SECURITY THREAT DETECTED BASED ON PERFORMING THE SECURITY ANALYTICS ON THE ENTITY-WIDE DATABASE ASSET INDEX?          NO

YES

342 — PERFORM, BY THE COMPUTER, A SET OF ACTION STEPS TO MITIGATE THE DATABASE SECURITY THREAT AND INCREASE DATABASE SECURITY

FIG. 3C          ( END )

ENTITY-WIDE DATABASE ASSET INDEX GENERATION

BACKGROUND

The disclosure relates generally to databases and more specifically to database security.

A database is a collection of data or information organized for rapid search and retrieval by a computer. Databases are structured to facilitate the storage, retrieval, modification, and deletion of data in conjunction with various data-processing operations. A database management system allows users to access the data contained in databases, although restrictions may exist that limit access to particular data. Databases are used, for example, to support operations of entities, such as, for example, enterprises, businesses, companies, organizations, institutions, agencies, and the like.

Database security refers to a range of tools, controls, and measures designed to establish and preserve database confidentiality, integrity, and availability against compromises. Security threats or risks to databases include, for example, unauthorized access to sensitive data, malware infections causing unauthorized access, deletion of or alteration to data, denial of authorized access to the database, and the like.

SUMMARY

According to one illustrative embodiment, a computer-implemented method for entity-wide database asset index generation is provided. A computer generates an entity-wide database asset index corresponding to an entity identifying all observed database instances across a plurality of database servers by each respective security monitoring system of a plurality of different security monitoring systems corresponding to the entity and one or more linked sets of same database instances observed by more than one security monitoring system of the plurality of different security monitoring systems. The computer performs security analytics on the entity-wide database asset index corresponding to the entity that identifies all of the observed database instances across the plurality of database servers by each respective security monitoring system of the plurality of different security monitoring systems corresponding to the entity and the one or more linked sets of same database instances observed by more than one security monitoring system of the plurality of different security monitoring systems to detect any database security threats. According to other illustrative embodiments, a computer system and computer program product for entity-wide database asset index generation are provided.

BRIEF DESCRIPTION OF THE DRAWINGS

FIGS. 3A-3C are a flowchart illustrating a process for entity-wide database asset index generation in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
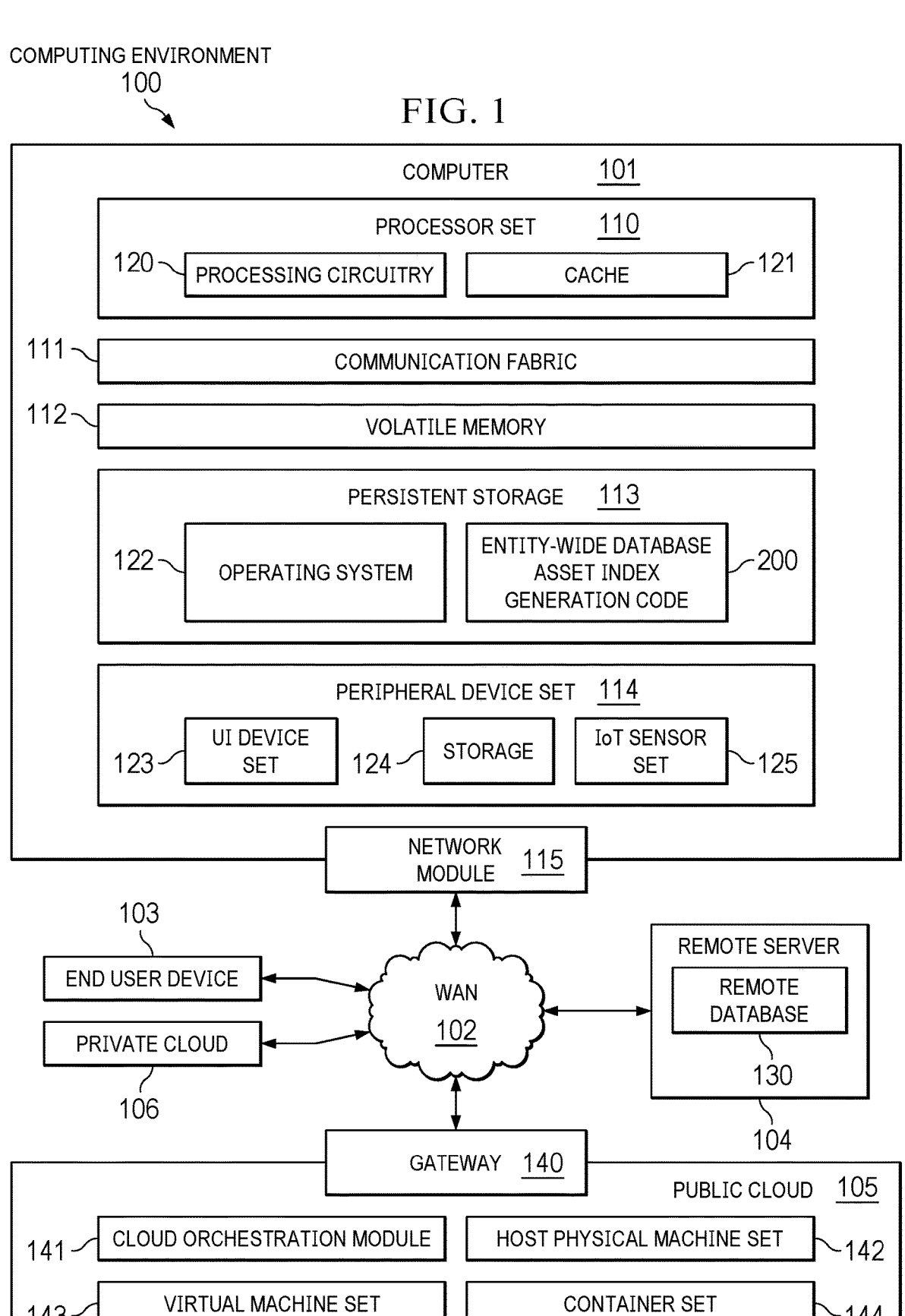
FIG. 1 is a pictorial representation of a computing environment in which illustrative embodiments may be implemented.
Figure 2:
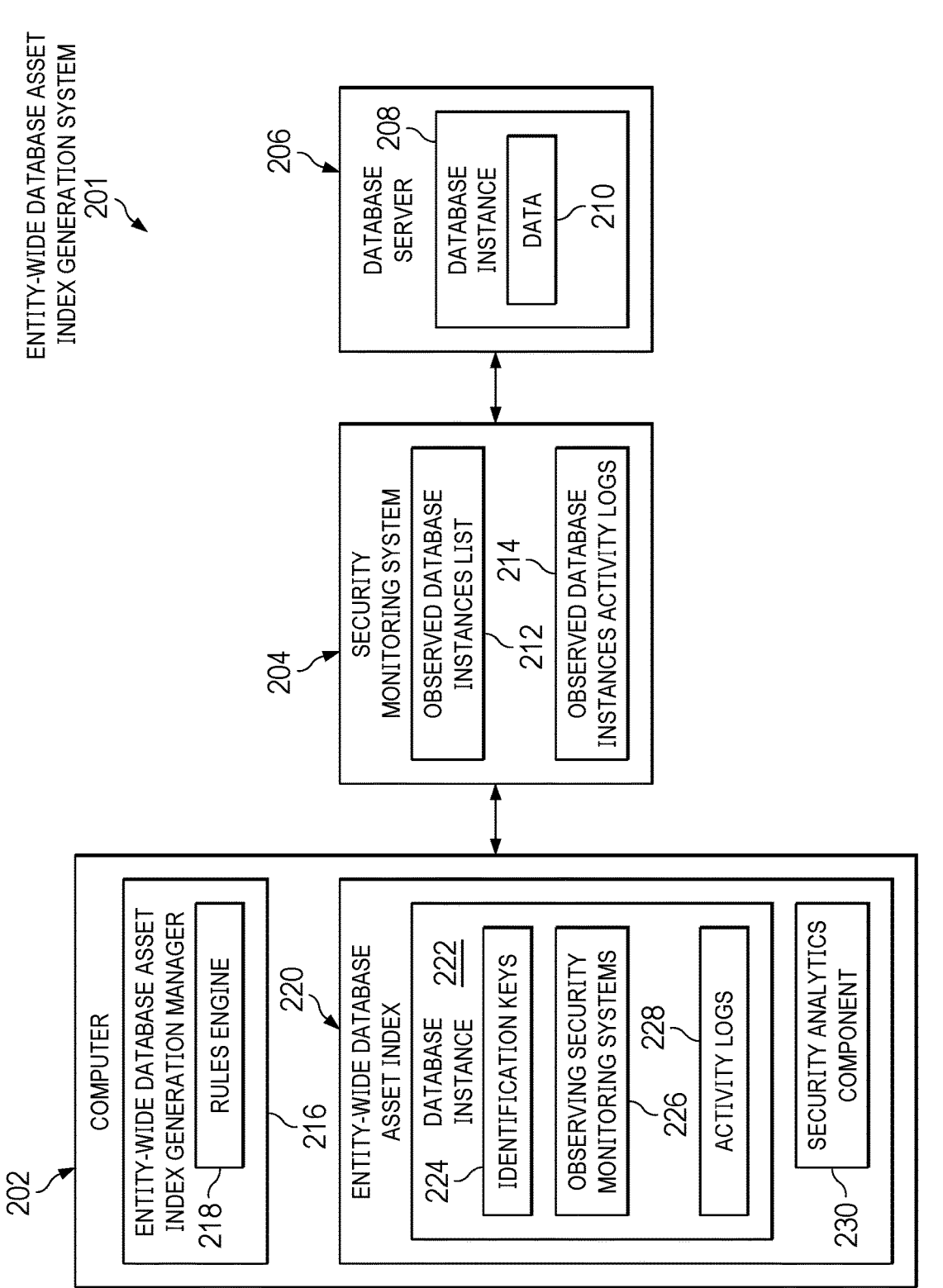
FIG. 2 is a diagram illustrating an example of an entity-wide database asset index generation system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as entity-wide database asset index generation code 200. For example, entity-wide database asset index generation code 200 tracks all database instances of an entity by matching and linking together same database instances observed by different security monitoring systems in an entity-wide database asset index to increase database security and, therefore, data security. Entity-wide database asset index generation code 200 utilizes a set of rules to match same database instances together based on unique database identification keys. For example, the set of rules can include a rule identifying a group of database identification keys needed to generate a unique identifier for a particular database instance based on the type of that particular database instance. In addition, the set of rules can include another rule identifying a minimum set of database identification keys needed to determine whether a match exists between certain database instances.

In addition to entity-wide database asset index generation code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and entity-wide database asset index generation code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in entity-wide database asset index generation code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a customer of the entity-wide database asset index generation service provided by computer 101), and may take any of the forms discussed above in connection with computer 101. EUD 103 typically receives helpful and useful data from the operations of computer 101. For example, in a hypothetical case where computer 101 is designed to provide an entity-wide database asset index to the end user, this entity-wide database asset index would typically be communicated from network module 115 of computer 101 through WAN 102 to EUD 103. In this way. EUD 103 can display, or otherwise present, the entity-wide database asset index to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same service provider that operates computer 101. Remote server 104 represents the machine(s) that collect and store helpful and useful data for use by other computers, such as computer 101. For example, in a hypothetical case where computer 101 is designed and programmed to provide an entity-wide database asset index based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

An important task in maintaining cyber security of an entity (e.g., enterprise, business, company, organization, institution, agency, or the like) is an ability to track all of the assets of that entity. Of these assets, databases are one of the most important because databases usually maintain most of the data and databases can contain sensitive or confidential data corresponding to the entity. Each of these databases should have some type of database activity monitoring component deployed on it for activity auditing, security, and analysis (e.g., database behavior analysis).

However, it is challenging for a large entity to keep track of all of its databases. Even though an administrator, such as, for example, an information security officer, tries to utilize processes that will allow the administrator to track these database assets, often times one or more of these database assets are set up in a non-conformant manner so that the administrator is not aware of all the entity's databases. As a result, there is a need to automatically discover each database asset of an entity, along with its database type and version, and whether that particular database is part of a cluster of databases or not.

In order to be able to track each database, a unique identifier needs to be used for recognizing each database individually. While some databases have a static Internet Protocol (IP) address that can identify a database uniquely, other databases (e.g., databases in a cloud environment) have changing IP addresses. As a result, IP addresses alone should not be used as unique identifiers for databases. Other types of unique identifiers can be used, such as, for example, a database name, service name, or host name. Cloud provider details can also be used for unique identifiers. In addition, communication port details can be used as part of unique identifiers. Further, adding IPv6 or IPV4 details to unique identifiers can make the unique identifiers more complex. Moreover, every system may use different identifiers to track, or to connect to, the database.

Another challenge is that multiple different security monitoring systems observe and monitor the databases of a large entity and each of these different security monitoring systems observes databases from a different perspective. For example, one current database security platform focuses on the databases (e.g., an endpoint detection and response agent of the platform has visibility from the platform and will be aware of the host database server and the operating system level, while a web application firewall of the platform focuses on the application server, data loss prevention on the server itself, and the like).

Consequently, one or more of the databases of an entity can be observed multiple times by different security monitoring systems, which have different visibilities. As a result, some of the database identification information may not match between the different security monitoring systems. For example, the web application firewall may only be aware of the external IP address corresponding to a database, while the endpoint detection and response agent is aware of the internal IP address and the HostName corresponding to that same database. Thus, neither the web application firewall nor the endpoint detection and response agent will be aware of the fact that that particular database is hosted on the same database server.

Therefore, mapping and matching of all database assets of an entity across these different visibilities of the security monitoring systems is needed. In other words, no interoperability between these different security monitoring systems can be provided without this mapping and matching. For example, an unauthorized user (e.g., a malicious actor trying to insert ransomware) will try various layers to access an intended database target of an entity. Consolidation and correlation of all the different database identification information of the different security monitoring systems is needed to increase database security and decrease the possibility of unauthorized access.

An example of showing the need for this database tracking is an endpoint detection and response agent sending an alert indicating a possible unauthorized asset access security threat. If the endpoint detection and response agent is indicating a possible security threat to a database asset containing sensitive data of an entity, then the urgency of taking action is higher than if the security threat was to a printer. In addition, database tracking can assist in situations where a database is moved from one database server to another database server or where a database is cloned in part or in whole to another database server. Furthermore, database tracking can assist in finding backup databases, standby databases, distributed databases, and the like.

In a large entity environment, there can be tens of thousands of database servers containing different types of databases (e.g., relational databases, document-based databases, not only structured query language databases, and the like). Moreover, many database servers can include several database instances, and some database instances can be distributed databases located on different database servers in multiple locations. The task of mapping and tracking these database instances across tens of thousands of database servers of a large entity cannot reasonably be performed in the mind of a person. Further, no solution currently exists that can map and track all of these database instances.

Illustrative embodiments automatically identify, match, and track all database instances across a multitude of database servers of an entity by generating an entity-wide database asset index, thus providing an ability to discover security threat blind spots to improve data security of the entity. Illustrative embodiments obtain a list of observed database instances from each respective security monitoring system of a plurality of different security monitoring systems corresponding to the entity and utilize analytics to link the same database instances together in the entity-wide database asset index for database security threat detection.

Illustrative embodiments generate the entity-wide database asset index to include all the different keys (i.e., different types of database identification information), which illustrative embodiments utilize to enable a real time search for matching databases (i.e., multiple database entries corresponding to the same database). Illustrative embodiments define certain sets of keys and rules for exact or deterministic matching, while illustrative embodiments define other sets of keys and rules for inexact or probabilistic matching.

Illustrative embodiments generate the unique identifier for each particular database using a combination of different database identification keys corresponding to that particular database. For example, illustrative embodiments utilize a set of rules to determine which database identification keys to use as a unique identifier for a particular database. As an example rule, for database engine X and operating system Y, illustrative embodiments will generate the unique identifier for that particular database using the database identification keys ({Server IP}+{ServiceName}) or ({HostName}+{ServiceName}). In addition, illustrative embodiments utilize another set of rules that determine the minimum database identification keys needed for a match. For example, a rule can state that for database engine X, the {ServiceName} of a database instance is needed as a minimum to match another database instance with that same {ServiceName} (e.g., a database instance for database engine X can have multiple services associated with it, one for sales and one for finance).

For each database instance monitored by illustrative embodiments, if illustrative embodiments only have an IP address for a particular database instance, then illustrative embodiments execute a reverse Domain Name System (DNS) query for that IP address to obtain the HostName corresponding to that particular database instance. Similarly, if illustrative embodiments only have the HostName for that particular database instance, then illustrative embodiments execute a DNS query to obtain the IP address corresponding to that particular database instance. Afterward, illustrative embodiments determine whether the recently identified IP address or HostName corresponding to that particular database instance matches an IP address or HostName of a database instance contained in a list of monitored database instances of a security monitoring system. In response to illustrative embodiments determining that the recently identified IP address or HostName corresponding to that particular database instance matches the IP address or HostName of another database instance contained in the list of monitored database instances of a security monitoring system, illustrative embodiments determine that those two database instances represent the same database instance and link those two database instances together. In addition, if a database server is known by illustrative embodiments and illustrative embodiments have access credentials (e.g., password, security token, cryptographic key, or the like) to access that database server, then illustrative embodiments access that database server using the access credentials and identify each database instance located on that database server and add all information related to those database instances to the list of monitored database instances in the entity-wide database asset index.

Illustrative embodiments also utilize probabilistic matching to identify matching database instances based on asset matching analytics. Utilizing probabilistic matching, illustrative embodiment first query a set of database feature objects (e.g., database features such as table names, views, and the like), which corresponds to respective monitored database instances, from each respective security monitoring system of the entity. Then, illustrative embodiments compare the different sets of database feature objects corresponding to each pair of database instances to generate a similarity score between each pair of database instances. Illustrative embodiments compare the similarity score to a minimum similarity score threshold level (e.g., 70% similarity, 75% similarity, 80% similarity, 85% similarity, 90% similarity, or the like). For pairs of database instances that have a similarity score greater than or equal to the minimum similarity score threshold level, illustrative embodiments determine that those two database instances are the same database instance. Illustrative embodiments further perform principal component analysis on vectors of the different sets of database feature objects and utilize k-nearest neighbor clustering to match the rest of the unmatched database instances to known database instances. Thus, illustrative embodiments identify sets of same database instances, each set of same database instances coming from different security monitoring systems.

For each respective security monitoring system having a list of monitored database instances, where each database instance in the list includes a set of objects, illustrative embodiments retrieve each respective set of objects from each respective security monitoring system having this data using, for example, sniffed activities. Alternatively, illustrative embodiments retrieve the sets of objects corresponding to observed database instances from a scanner that observed these database instances (e.g., classification scanner, violation capturing scanner, vulnerability assessment scanner, or the like). Illustrative embodiments generate a vector for each particular database instance indicating the number of matching objects that a particular database instance has with one or more other database instances included in lists from one or more other security monitoring systems.

To achieve this database object matching, illustrative embodiments can generate a hash table where objects are the database features and values are lists of database instances that have a particular object. For every list of database instances that have a particular object in the hash table, illustrative embodiments match those database instances that have that particular object. Alternatively, illustrative embodiments can generate a table indicating the set of objects for each database instance in the table and then using a select statement for each particular object to obtain all the matching database instances that have the same object.

Illustrative embodiments can also optionally add connection information (e.g., IP address, port number, and the like), as well as other database identification keys, to the sets of objects corresponding to the different database instances. Illustrative embodiments can place a higher weight on this connection information when determining a similarity score between database instances because this connection information provides a greater indication that certain observed database instances are the same database. Moreover, illustrative embodiments can add cloud provider information, IPv6 information, or the like to the set of objects corresponding to the different database instances.

Illustrative embodiments can also utilize required fields rules to further determine whether certain database instances are considered matched or not, beyond using the similarity score threshold level. For example, illustrative embodiments can set the minimum similarity score threshold level to be 50% database feature object matching, plus at least one of the following must match: ServiceName, HostName, or IP address and port number.

Then, illustrative embodiments perform principal component analysis as a preparation phase for clustering. Illustrative embodiments utilize labeled database identification keys as an initial set of training data for the k-nearest neighbor clustering algorithm. Then, illustrative embodiments classify all remaining database instances that do not have any match. Illustrative embodiments classify each database instance to an existing cluster, which suggests that this particular database instance is the same as the other database instances in that cluster.

To select the "k" parameter for the k-nearest neighbor clustering algorithm, illustrative embodiments utilize a training set for applying a grid search on the parameter space between 1 to 8. Illustrative embodiments utilize 8 as the default configuration, which can be changed. Illustrative embodiments utilize the labeled database identification keys as the training data set and select the k parameter that optimizes matching of database instances. Illustrative embodiments collect feedback from the customer regarding whether a determined match between database instances is correct or not. Illustrative embodiments utilize the customer feedback to improve the training data set of the k-nearest neighbor clustering algorithm to improve clustering accuracy over time.

Furthermore, illustrative embodiments can define a maximum distance threshold level such that illustrative embodiments will not place any database instance, which has a distance greater than the maximum distance threshold level from the center of a particular cluster, in that particular cluster even though that particular cluster was the nearest neighbor. Thus, illustrative embodiments generate a plurality of database clusters, each cluster containing activity logs of one or more database instances from each security monitoring system that monitors that same instance of database per each cluster.

Based on the plurality of database clusters, illustrative embodiments generate the entity-wide database asset index containing all of the database instances corresponding to the entity, along with identification of their observing security monitoring systems, their corresponding set of database identification keys, and the activity logs from the observing security monitoring systems that monitor the same database instance. As a result, illustrative embodiment group all of the information corresponding to each particular database instance collected from all observing security monitoring systems in one place (i.e., the entity-wide database asset index). Illustrative embodiments run security analytics on all of the information corresponding to each particular database instance contained in the entity-wide database asset index to discover any database security threats (e.g., unauthorized database access activity). In response to detecting a database security threat based on running the security analytics, illustrative embodiments automatically perform a set of action steps. The set of action steps can include, for example, identifying the source of the database security threat, sending a security notification to security personnel regarding the database security threat, denying access to the database pending security personnel review, scanning the database for unauthorized software, and the like.

Thus, illustrative embodiments provide one or more technical solutions that overcome a technical problem with an inability of current solutions to generate an entity-wide database asset index to detect database security threat blind spots. As a result, these one or more technical solutions provide a technical effect and practical application in the field of data security.

With reference now to FIG. 2, a diagram illustrating an example of an entity-wide database asset index generation system is depicted in accordance with an illustrative embodiment. Entity-wide database asset index generation system 201 may be implemented in a computing environment, such as computing environment 100 in FIG. 1. Entity-wide database asset index generation system 201 is a system of hardware and software components for generating an entity-wide database asset index for an entity to track all database instances of the entity across different database servers that can be observed by multiple security monitoring system to increase database and data security.

In this example, entity-wide database asset index generation system 201 includes computer 202, security monitoring system 204, and database server 206. However, it should be noted that entity-wide database asset index generation system 201 is intended as an example only and not as a limitation on illustrative embodiments. For example, entity-wide database asset index generation system 201 can include any number of computers, security monitoring systems, database servers, and other devices and components not shown.

Computer 202 can be, for example, computer 101 in FIG. 1. Security monitoring system 204 and database server 206 can be, for example, host physical machines in host physical machine set 142 in FIG. 1. In addition, computer 202, security monitoring system 204, and database server 206 can be located in a public cloud, such as, for example, public cloud 105 in FIG. 1, a private cloud, such as, for example, private cloud 106 in FIG. 1, or a combination of both a public cloud and a private cloud. Further, security monitoring system 204 represents a plurality of different security monitoring systems, each security monitoring system observing one or more database instances on one or more database servers. Furthermore, database server 206 represents a plurality of database servers, each database server containing one or more database instances corresponding to the entity.

In this example, database server 206 contains database instance 208. Database instance 208 represents a set of one or more database instances in database server 206. Database instance 208 stores data 210. Data 210 can represent any type of data corresponding to the entity and can include sensitive or confidential data.

Security monitoring system 204 observes and logs activities being performed on data of each respective database instance, such as database instance 208, of a set of database instances contained in a set of database servers, which includes database server 206, being monitored by security monitoring system 204. Security monitoring system 204 identifies the set of database instances being observed by security monitoring system 204 using observed database instances list 212. In addition, security monitoring system 204 records the observed activities on the set of database instances in observed database instances activity logs 214. Observed database instances activity logs 214 can also include other information, such as, for example, database instance identification information, database instance feature information, IP address information, port information, and the like.

Computer 202 utilizes entity-wide database asset index generation manager 216 to generate entity-wide database asset index 220 for the entity identifying all of the database instances corresponding to the entity across a plurality of database servers connected to a network, such as, for example, WAN 102 in FIG. 1. Entity-wide database asset index generation manager 216 can be implemented by entity-wide database asset index generation code 200 in FIG. 1. Entity-wide database asset index generation manager 216 utilizes rules engine 218 to identify database instance identification keys for uniquely identifying different types of database instances and to identify the minimum number of database identification keys need to identify a match between same database instances observed by different security monitoring systems.

In this example, entity-wide database asset index 220 includes database instance 222. Database instance 222 represents an entry corresponding to database instance 208 in entity-wide database asset index 220. However, it should be noted that entity-wide database asset index 220 includes a plurality of entries for a plurality of different database instances corresponding to the entity. The entry for database instance 222 includes identification keys 224, observing security monitoring systems 226, and activity logs 228. Identification keys 224 represent a combination of at least two identification keys (e.g., ({Server IP}+{ServiceName}), ({HostName}+{ServiceName}), or the like) that uniquely identify database instance 208, which is represented by database instance 222. Entity-wide database asset index generation manager 216 utilizes identification keys 224 to match database instance 222 with a same database instance observed by another security monitoring system other than security monitoring system 204. Observing security monitoring systems 226 identify the set of security monitoring systems that is observing database instance 208, which is represented by database instance 222. Activity logs 228 represent a record of all accesses to and activities performed on database instance 208 represented by database instance 222. Activity logs 228 also includes database features corresponding to database instance 208, which entity-wide database asset index generation manager 216 also utilizes to identify matching same database instances observed by one or more other security monitoring systems other than security monitoring system 204.

Further, entity-wide database asset index generation manager 216 utilizes security analytics component 230 to run security analytics on entity-wide database asset index 220 to identify any potential database security threats (e.g., unauthorized database access). In response to security analytics component 230 detecting a database security threat, entity-wide database asset index generation manager 216 automatically performs a set of action steps to mitigate the database security threat. The action steps can include, for example, at least one of sending a security notification to security personnel regarding the database security threat, denying access to the database pending security personnel review, scanning the database for unauthorized software, identifying the source of the database security threat, notifying authorities regarding the source of the database security threat, and the like.

With reference now to FIGS. 3A-3C, a flowchart illustrating a process for entity-wide database asset index generation is shown in accordance with an illustrative embodiment. The process shown in FIGS. 3A-3C may be implemented in a computer, such as, for example, computer 101 in FIG. 1 or computer 202 in FIG. 2. For example, the process shown in FIGS. 3A-3C may be implemented by entity-wide database asset index generation code 200 in FIG. 1 or entity-wide database asset index generation manager 216 in FIG. 2.

The process begins when the computer receives an input to generate an entity-wide database asset index corresponding to an entity to track all database instances of the entity across a plurality of database servers to detect database security threats (step 302). In response to receiving the input to generate the entity-wide database asset index, the computer retrieves information corresponding to observed database instances across the plurality of database servers from each respective security monitoring system of a plurality of different security monitoring systems corresponding to the entity via a network (step 304). The retrieved information includes, for example, database server identification information, database instance identification information, database instance type information, database instance service information, database instance feature information, database instance activity log information, IP address information, IP version information, port number information, and the like.

The computer identifies a set of database identification keys for each respective database instance of the observed database instances across the plurality of database servers based on the information retrieved from each respective security monitoring system of the plurality of different security monitoring system corresponding to the entity via the network (step 306). The computer makes a determination as to whether the set of database identification keys of each respective database instance of the observed database instances includes at least two database identification keys (step 308).

If the computer determines that the set of database identification keys of each respective database instance of the observed database instances does include at least two database identification keys, yes output of step 308, then the process proceeds to step 316. If the computer determines that the set of database identification keys of each respective database instance of the observed database instances does not include at least two database identification keys, no output of step 308, then the computer identifies one or more particular database instances of the observed database instances that only have one database identification key in the set of database identification keys (step 310).

In response to the computer identifying the one or more particular database instances of the observed database instances that only have one database identification key in the set of database identification keys, the computer obtains at least one additional database identification key for each of the one or more particular database instances that only has the one database identification key in the set of database identification keys from an online lookup service (step 312). The online lookup service can be, for example, a DNS. The computer adds the at least one additional database identification key obtained for each of the one or more particular database instances to the set of database identification keys of a corresponding database instance of the one or more particular database instances (step 314).

The computer generates a unique identifier for each respective database instance of the observed database instances by each respective security monitoring system of the plurality of different security monitoring systems based on the set of database identification keys of each respective database instance that includes at least two database identification keys (step 316). The computer performs deterministic matching of the unique identifier of each respective database instance of the observed database instances across the plurality of database servers by each respective security monitoring system of the plurality of different security monitoring systems to identify matching unique identifiers of certain database instances (step 318). The computer identifies one or more sets of same database instances based on the matching unique identifiers of the certain database instances observed by more than one security monitoring system of the plurality of different security monitoring systems (step 320).

In addition, the computer identifies a set of database feature objects for each respective database instance of the observed database instances by each respective security monitoring system of the plurality of different security monitoring systems to perform probabilistic matching based on the information retrieved from each respective security monitoring system (step 322). The set of database feature objects of a given database instance include, for example, number of tables, names of the tables, column identifiers of the tables, views, and the like. The computer performs a comparison of different sets of database feature objects corresponding to each pair of database instances of the observed database instances (step 324). The computer generates a similarity score for each pair of database instances of the observed database instances based on performing the comparison of the different sets of database feature objects corresponding to each pair of database instances (step 326).

The computer makes a determination as to whether one or more pairs of database instances of the observed database instances have a corresponding similarity score greater than a similarity score threshold level (step 328). If the computer determines that no pair of database instances of the observed database instances has a corresponding similarity score greater than the similarity score threshold level, no output of step 328, then the process proceeds to step 334. If the computer determines that one or more pairs of database instances of the observed database instances do have a corresponding similarity score greater than the similarity score threshold level, yes output of step 328, then the computer determines that each pair of database instances of the one or more pairs of database instances having a similarity score greater than the similarity score threshold level represents a different pair of same database instances observed by more than one security monitoring system of the plurality of different security monitoring systems to form one or more different pairs of same database instances (step 330). The computer adds the one or more different pairs of same database instances to the one or more sets of same database instances (step 332).

The computer links each set of same database instances of the one or more sets of same database instances together to form one or more linked sets of same database instances (step 334). The computer generates the entity-wide database asset index corresponding to the entity identifying all of the observed database instances across the plurality of database servers by each respective security monitoring system of the plurality of different security monitoring systems corresponding to the entity and the one or more linked sets of same database instances observed by more than one security monitoring system of the plurality of different security monitoring systems (step 336).

The computer performs security analytics on the entity-wide database asset index corresponding to the entity that identifies all of the observed database instances across the plurality of database servers by each respective security monitoring system of the plurality of different security monitoring systems corresponding to the entity and the one or more linked sets of same database instances observed by more than one security monitoring system of the plurality of different security monitoring systems to detect any database security threats (step 338). The computer makes a determination as to whether a database security threat was detected based on performing the security analytics on the entity-wide database asset index (step 340). If the computer determines that no database security threat was detected based on performing the security analytics on the entity-wide database asset index, no output of step 340, then the process terminates thereafter. If the computer determines that a database security threat was detected based on performing the security analytics on the entity-wide database asset index, yes output of step 340, then the computer performs a set of action steps to mitigate the database security threat and increase database security (step 342). The set of action steps include, for example, at least one of identifying a source of the database security threat, sending a security notification to security personnel regarding the database security threat, preventing access to a database instance corresponding to the database security threat pending security personnel review, scanning the database instance for unauthorized software, and the like. Thereafter, the process terminates.

Thus, illustrative embodiments of the present disclosure provide a computer-implemented method, computer system, and computer program product for generating an entity-wide database asset index to increase database security. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for entity-wide database asset index generation, the computer-implemented method comprising:

generating, by a computer, an entity-wide database asset index corresponding to an entity identifying all observed database instances across a plurality of database servers by each respective security monitoring system of a plurality of different security monitoring systems corresponding to the entity and one or more linked sets of same database instances observed by more than one security monitoring system of the plurality of different security monitoring systems, wherein the one more linked sets of same database instances are matched based on similarities between database feature objects for each pair of database instances from the observed database instances, and wherein the matchings comprise:

generating, by the computer, a similarity score for each pair of database instances of the observed database instances based on performing a comparison of the different sets of database feature objects corresponding to each pair of database instances;

determining, by the computer, whether one or more pairs of database instances of the observed database instances have a corresponding similarity score greater than a similarity score threshold level; and performing, by the computer, security analytics on the entity-wide database asset index corresponding to the entity that identifies all of the observed database instances across the plurality of database servers by each respective security monitoring system of the plurality of different security monitoring systems corresponding to the entity and the one or more linked sets of same database instances observed by more than one security monitoring system of the plurality of different security monitoring systems to detect any database security threats.

2. The computer-implemented method of claim 1, further comprising:

determining, by the computer, whether a database security threat was detected based on performing the security analytics on the entity-wide database asset index; and performing, by the computer, a set of action steps to mitigate the database security threat and increase database security in response to the computer determining that the database security threat was detected based on performing the security analytics on the entity-wide database asset index.

3. The computer-implemented method of claim 2, wherein the set of action steps include at least one of identifying a source of the database security threat, sending a security notification to security personnel regarding the database security threat, preventing access to a database instance corresponding to the database security threat, and scanning the database instance for unauthorized software.

4. The computer-implemented method of claim 1, further comprising:
    receiving, by the computer, an input to generate the entity-wide database asset index corresponding to the entity to track all database instances of the entity across the plurality of database servers to detect database security threats;
    retrieving, by the computer, information corresponding to observed database instances across the plurality of database servers from each respective security monitoring system of the plurality of different security monitoring systems corresponding to the entity via a network; and
    identifying, by the computer, a set of database identification keys for each respective database instance of the observed database instances across the plurality of database servers based on the information retrieved from each respective security monitoring system of the plurality of different security monitoring system corresponding to the entity via the network.

5. The computer-implemented method of claim 4, further comprising:
    determining, by the computer, whether the set of database identification keys of each respective database instance of the observed database instances includes at least two database identification keys;
    identifying, by the computer, one or more particular database instances of the observed database instances that only have one database identification key in the set of database identification keys in response to the computer determining that the set of database identification keys of each respective database instance of the observed database instances does not include at least two database identification keys;
    obtaining, by the computer, at least one additional database identification key for each of the one or more particular database instances that only has the one database identification key in the set of database identification keys from an online lookup service; and
    adding, by the computer, the at least one additional database identification key obtained for each of the one or more particular database instances to the set of database identification keys of a corresponding database instance of the one or more particular database instances.

6. The computer-implemented method of claim 5, further comprising:
    generating, by the computer, a unique identifier for each respective database instance of the observed database instances by each respective security monitoring system of the plurality of different security monitoring systems based on the set of database identification keys of each respective database instance that includes at least two database identification keys.

7. The computer-implemented method of claim 6, further comprising:
    performing, by the computer, deterministic matching of the unique identifier of each respective database instance of the observed database instances across the plurality of database servers by each respective security monitoring system of the plurality of different security monitoring systems to identify matching unique identifiers of certain database instances; and
    identifying, by the computer, one or more sets of same database instances based on the matching unique identifiers of the certain database instances observed by more than one security monitoring system of the plurality of different security monitoring systems.

8. The computer-implemented method of claim 7, further comprising:
    identifying, by the computer, a set of database feature objects for each respective database instance of the observed database instances by each respective security monitoring system of the plurality of different security monitoring systems to perform probabilistic matching based on the information retrieved from each respective security monitoring system; and
    performing, by the computer, the comparison of different sets of database feature objects corresponding to each pair of database instances of the observed database instances.

9. The computer-implemented method of claim 8, further comprising:
    determining, by the computer, that each pair of database instances of the one or more pairs of database instances having the similarity score greater than the similarity score threshold level represents a different pair of same database instances observed by more than one security monitoring system of the plurality of different security monitoring systems to form one or more different pairs of same database instances in response to the computer determining that the one or more pairs of database instances of the observed database instances do have a corresponding similarity score greater than the similarity score threshold level;
    adding, by the computer, the one or more different pairs of same database instances to the one or more sets of same database instances; and
    linking, by the computer, each set of same database instances of the one or more sets of same database instances together to form the one or more linked sets of same database instances.

10. A computer system for entity-wide database asset index generation, the computer system comprising:
    a communication fabric;
    a storage device connected to the communication fabric, wherein the storage device stores program instructions; and
    a processor connected to the communication fabric, wherein the processor executes the program instructions to:
        generate an entity-wide database asset index corresponding to an entity identifying all observed database instances across a plurality of database servers by each respective security monitoring system of a plurality of different security monitoring systems corresponding to the entity and one or more linked sets of same database instances observed by more than one security monitoring system of the plurality of different security monitoring systems, wherein the one more linked sets of same database instances are matched based on similarities between database feature objects for each pair of database instances from the observed database instances, and wherein the matchings comprise:
        generate a similarity score for each pair of database instances of the observed database instances based on performing a comparison of the different sets of database feature objects corresponding to each pair of database instances;

determine whether one or more pairs of database instances of the observed database instances have a corresponding similarity score greater than a similarity score threshold level; and perform security analytics on the entity-wide database asset index corresponding to the entity that identifies all of the observed database instances across the plurality of database servers by each respective security monitoring system of the plurality of different security monitoring systems corresponding to the entity and the one or more linked sets of same database instances observed by more than one security monitoring system of the plurality of different security monitoring systems to detect any database security threats.

11. The computer system of claim 10, wherein the processor further executes the program instructions to:

determine whether a database security threat was detected based on performing the security analytics on the entity-wide database asset index; and perform a set of action steps to mitigate the database security threat and increase database security in response to determining that the database security threat was detected based on performing the security analytics on the entity-wide database asset index.

12. The computer system of claim 10, wherein the processor further executes the program instructions to:

receive an input to generate the entity-wide database asset index corresponding to the entity to track all database instances of the entity across the plurality of database servers to detect database security threats;

retrieve information corresponding to observed database instances across the plurality of database servers from each respective security monitoring system of the plurality of different security monitoring systems corresponding to the entity via a network; and identify a set of database identification keys for each respective database instance of the observed database instances across the plurality of database servers based on the information retrieved from each respective security monitoring system of the plurality of different security monitoring system corresponding to the entity via the network.

13. The computer system of claim 12, wherein the processor further executes the program instructions to:

determine whether the set of database identification keys of each respective database instance of the observed database instances includes at least two database identification keys;

identify one or more particular database instances of the observed database instances that only have one database identification key in the set of database identification keys in response to determining that the set of database identification keys of each respective database instance of the observed database instances does not include at least two database identification keys;

obtain at least one additional database identification key for each of the one or more particular database instances that only has the one database identification key in the set of database identification keys from an online lookup service; and add the at least one additional database identification key obtained for each of the one or more particular database instances to the set of database identification keys of a corresponding database instance of the one or more particular database instances.

14. The computer system of claim 13, wherein the processor further executes the program instructions to:

generate a unique identifier for each respective database instance of the observed database instances by each respective security monitoring system of the plurality of different security monitoring systems based on the set of database identification keys of each respective database instance that includes at least two database identification keys.

15. A computer program product for entity-wide database asset index generation, the computer program product comprising a computer-readable storage medium having program instructions embodied therewith, the program instructions executable by a computer to cause the computer to:

generate an entity-wide database asset index corresponding to an entity identifying all observed database instances across a plurality of database servers by each respective security monitoring system of a plurality of different security monitoring systems corresponding to the entity and one or more linked sets of same database instances observed by more than one security monitoring system of the plurality of different security monitoring systems, wherein the one more linked sets of same database instances are matched based on similarities between database feature objects for each pair of database instances from the observed database instances, and wherein the matchings comprise:

generate a similarity score for each pair of database instances of the observed database instances based on performing a comparison of the different sets of database feature objects corresponding to each pair of database instances;

determine whether one or more pairs of database instances of the observed database instances have a corresponding similarity score greater than a similarity score threshold level; and perform security analytics on the entity-wide database asset index corresponding to the entity that identifies all of the observed database instances across the plurality of database servers by each respective security monitoring system of the plurality of different security monitoring systems corresponding to the entity and the one or more linked sets of same database instances observed by more than one security monitoring system of the plurality of different security monitoring systems to detect any database security threats.

16. The computer program product of claim 15, wherein the program instructions further cause the computer to:

determine whether a database security threat was detected based on performing the security analytics on the entity-wide database asset index; and perform a set of action steps to mitigate the database security threat and increase database security in response to determining that the database security threat was detected based on performing the security analytics on the entity-wide database asset index.

17. The computer program product of claim 15, wherein the program instructions further cause the computer to:

receive an input to generate the entity-wide database asset index corresponding to the entity to track all database instances of the entity across the plurality of database servers to detect database security threats;

retrieve information corresponding to observed database instances across the plurality of database servers from each respective security monitoring system of the plurality of different security monitoring systems corresponding to the entity via a network; and identify a set of database identification keys for each respective database instance of the observed database instances across the plurality of database servers based on the information retrieved from each respective security monitoring system of the plurality of different security monitoring system corresponding to the entity via the network.

18. The computer program product of claim 17, wherein the program instructions further cause the computer to:

determine whether the set of database identification keys of each respective database instance of the observed database instances includes at least two database identification keys;

identify one or more particular database instances of the observed database instances that only have one database identification key in the set of database identification keys in response to determining that the set of database identification keys of each respective database instance of the observed database instances does not include at least two database identification keys;

obtain at least one additional database identification key for each of the one or more particular database instances that only has the one database identification key in the set of database identification keys from an online lookup service; and add the at least one additional database identification key obtained for each of the one or more particular database instances to the set of database identification keys of a corresponding database instance of the one or more particular database instances.

19. The computer program product of claim 18, wherein the program instructions further cause the computer to:

generate a unique identifier for each respective database instance of the observed database instances by each respective security monitoring system of the plurality of different security monitoring systems based on the set of database identification keys of each respective database instance that includes at least two database identification keys.

20. The computer program product of claim 19, wherein the program instructions further cause the computer to:

perform deterministic matching of the unique identifier of each respective database instance of the observed database instances across the plurality of database servers by each respective security monitoring system of the plurality of different security monitoring systems to identify matching unique identifiers of certain database instances; and identify one or more sets of same database instances based on the matching unique identifiers of the certain database instances observed by more than one security monitoring system of the plurality of different security monitoring systems.

* * * * *